(12) United States Patent
Song et al.

(10) Patent No.: US 11,020,861 B2
(45) Date of Patent: Jun. 1, 2021

(54) INTELLIGENT DEVICE SYSTEM AND INTELLIGENT DEVICE CONTROL METHOD

(71) Applicant: SHENZHEN FLY RODENT DYNAMICS INTELLIGENT TECHNOLOGY CO., LTD., Shenzhen (CN)

(72) Inventors: Zhangjun Song, Shenzhen (CN); Peng Liu, Shenzhen (CN); Fujun Huang, Shenzhen (CN)

(73) Assignee: SHENZHEN FLY RODENT DYNAMICS INTELLIGENT TECHNOLOGY CO., LTD., Shenzhen (CN)

( * ) Notice: Subject to any disclaimer, the term of this patent is extended or adjusted under 35 U.S.C. 154(b) by 299 days.

(21) Appl. No.: 16/022,435

(22) Filed: Jun. 28, 2018

(65) Prior Publication Data
US 2019/0152065 A1    May 23, 2019

(30) Foreign Application Priority Data

Nov. 22, 2017    (CN) .......................... 201711176068.5

(51) Int. Cl.
| | | |
|---|---|---|
| *B25J 13/00* | (2006.01) | |
| *G10L 15/22* | (2006.01) | |
| *G10L 15/26* | (2006.01) | |
| *G06F 3/16* | (2006.01) | |

(52) U.S. Cl.
CPC ............ *B25J 13/003* (2013.01); *G06F 3/167* (2013.01); *G10L 15/22* (2013.01); *G10L 15/26* (2013.01); *G10L 2015/223* (2013.01)

(58) Field of Classification Search
CPC .............. B25J 13/003; G10L 2015/223; G10L 15/265; G10L 15/22
USPC .......................................................... 700/258
See application file for complete search history.

(56) References Cited

U.S. PATENT DOCUMENTS

| | | | | |
|---|---|---|---|---|
| 7,136,709 | B2 * | 11/2006 | Arling ..................... | G05B 15/02 700/65 |
| 8,769,598 | B2 * | 7/2014 | Darbee .................. | H04N 7/163 725/133 |
| 8,855,303 | B1 * | 10/2014 | Glatfelter ................. | H04K 1/00 380/44 |
| 9,037,296 | B2 * | 5/2015 | Choe ..................... | G05D 1/0044 700/259 |
| 9,172,808 | B2 * | 10/2015 | Zeppenfeld ........... | H04M 3/523 |

(Continued)

*Primary Examiner* — Khoi H Tran
*Assistant Examiner* — Rodney P King
(74) *Attorney, Agent, or Firm* — Klarquist Sparkman, LLP (57) ABSTRACT

An intelligent device control method applied to an intelligent device, including the steps of: providing a mobile terminal configured to send a control instruction to the intelligent device, inputting the control instruction on the mobile terminal and converting the control instruction into an audio signal, sending the audio signal to the intelligent device, enabling the intelligent device to receive the audio signal, convert the audio signal to restore it to the control instruction, and read the control instruction, and executing a corresponding action according to the control instruction. The intelligent device control method is capable of making the transmission processes of control instructions simplified and efficient and improving the user experience. An intelligent device system is also disclosed.

16 Claims, 4 Drawing Sheets

(56) References Cited

U.S. PATENT DOCUMENTS

| | | | | |
|---|---|---|---|---|
| 9,839,267 | B1* | 12/2017 | Gharabegian | G06F 3/167 |
| 9,953,520 | B2* | 4/2018 | Wu | H04W 84/12 |
| 9,971,766 | B2* | 5/2018 | Pasupalak | G06F 40/35 |
| 10,270,736 | B2* | 4/2019 | Xu | G10L 15/26 |
| 10,437,057 | B2* | 10/2019 | Shibukawa | G06F 3/0484 |
| 2012/0252414 | A1* | 10/2012 | Ishidoshiro | H04L 63/083 |
| | | | | 455/411 |

* cited by examiner

INTELLIGENT DEVICE SYSTEM AND INTELLIGENT DEVICE CONTROL METHOD

CROSS-REFERENCE TO RELATED APPLICATIONS

This application claims priority to Chinese Patent Application No. 201711176068.5, filed on Nov. 22, 2017, with the State Intellectual Property Office (SIPO) of the People's Republic of China and entitled "Intelligent Device System and Intelligent Device Control Method", the contents of which are herein incorporated by reference in their entirety.

TECHNICAL FIELD

The present disclosure relates to the field of intelligent control, and particularly to an intelligent device system and an intelligent device control method.

BACKGROUND

With the development of network technology, remote control technology and intelligent technology, more and more devices can be remotely controlled, access a network and/or become intellectualized, for example, an air conditioner, a television, an electric rice cooker, an illuminating lamp, a cleaning robot (a cleaning device), an automobile, a toy car, etc. In the early technologies, it was a general practice to set a foolproof button on a device to perform turn-on/turn-off operation. In recent years, a series of improvements have been made, and the technologies have experienced various phases, e.g., being remotely controllable, being time pre-settable, being network distributable, being user-interactable, etc., and have developed more and more diverse functions. The requirements of user experience also become higher and higher. Modern people use mobile phones whenever and wherever possible. Thus, it is more practical and convenient to control all these functions by a mobile phone. To remotely control household appliances with a mobile phone has become a trend.

In the prior art, it is a general practice to install an APP (application) on a mobile phone and send control instructions to related devices through the APP. However, in order to facilitate the establishment of one-to-one communication between the APP and a corresponding device, the mobile phone and the device need to be connected to a network first. Taking a sweeping robot as an example, interaction between a mobile phone and a sweeping robot tends to be a standard configuration, and the user can control the sweeping robot to move forwards and backwards through a mobile phone APP, and can also show the environment map built by the robot and the sweeping track of the robot through the mobile phone. Before distributing network to the mobile phone and the robot, a router which has already accessed internet is needed to send out network signals. However, the account and the password of the router are unknown. Moreover, a robot generally does not have an input keyboard, and it is impossible to manually input the account and the password of the router on the body of the sweeping robot, so a mobile phone is needed to do the work. Also, if the mobile phone is intended to be directly connected to the robot, as the IP address of the robot is unknown, it is required that the sweeping robot is linked to the router first, an IP address can be assigned only after internet access succeeds, and only with this IP address can the mobile phone be connected with the sweeping robot.

Therefore, complex procedures are needed for realizing intercommunication between a mobile phone and a device. Moreover, when multiple devices are each controlled by a mobile phone, the information transmission between the mobile phone and the devices may experience conflicts or lags, or requires queuing for proceeding, which even easily causes breakdown of the system.

SUMMARY

Embodiments of the present disclosure provide an intelligent device control method, capable of making the transmission process of control instructions simplified and efficient and improving the user experience.

Embodiments of the present disclosure further provide an intelligent device system.

In order to solve the above technical problems, embodiments of the present disclosure employ the following technical solutions:

In a first aspect, an intelligent device control method is provided.

In a second aspect, embodiments of the present disclosure further provide an intelligent device system.

In a third aspect, embodiments of the present disclosure further provide a robot system control method.

Compared with the prior art, the technical solutions of the embodiments of the present disclosure at least have the following advantageous effects:

In the embodiments of the present disclosure, it is possible to input a control instruction on the mobile terminal, convert the control instruction into an audio signal and send the audio signal to the intelligent device, the intelligent device receives the audio signal and converts the audio signal to restore it to the control instruction. In this way, the control instruction is successfully transmitted to the intelligent device, without the use of a third-party device. An operator can simply and intuitively perform operations on the mobile terminal to directly transmit to the intelligent device the audio signal sent by the mobile terminal, so that the transmission of the control instruction is simple, convenient and efficient, which improves the user experience and saves the cost.

In addition, since the control instruction can be converted into an audio signal and then sent out, it is feasible to send the audio signal to a plurality of intelligent devices at the same time by using the same mobile terminal, which saves time and resources, thereby achieving efficient transmission of control instruction.

BRIEF DESCRIPTION OF THE DRAWINGS

In order to more clearly illustrate the technical solutions of the examples of the present disclosure or in the prior art, brief description is made below on the drawings required to be used in the description of the examples or the prior art. Obviously, the drawings in the following description only illustrate some of the examples of the present disclosure, and for those of ordinary skills in the art, other variations may be obtained from these drawings without inventive efforts.

DETAILED DESCRIPTION OF EMBODIMENTS

The technical solutions in examples of the present disclosure are clearly described below with reference to the drawings in examples of the present disclosure. Apparently, the described examples are merely some of the embodiments of the present disclosure, rather than all the examples. Based on the examples in the present disclosure, all the other examples obtained by those of ordinary skills in the art without inventive efforts shall be covered by the protection scope of the present disclosure.

The terms "first", "second", "third", "fourth", etc. (if present) in the description, the claims and the drawings of the present disclosure are used for distinguishing similar objects, rather than describing a particular order or sequence. It is to be understood that the data so used are interchangeable under appropriate circumstances so that the examples described herein can be implemented in other sequences than described or illustrated herein. In addition, the terms "comprising", "including", and any other variations thereof are intended to encompass a non-exclusive inclusion, for example, a process, method, system, product or device comprising a series of steps or units is not limited to the steps or units clearly listed, but can also comprise other steps or units not explicitly listed, or other inherent steps or units of these process, method, product or device. Moreover, the steps listed in a process and a method comprising a series of steps shall not be construed as being executed in the order listed, rather, the order in which the steps are executed may be changed so as to achieve any function that can be achieved by any combination of these steps.

Figure 1:
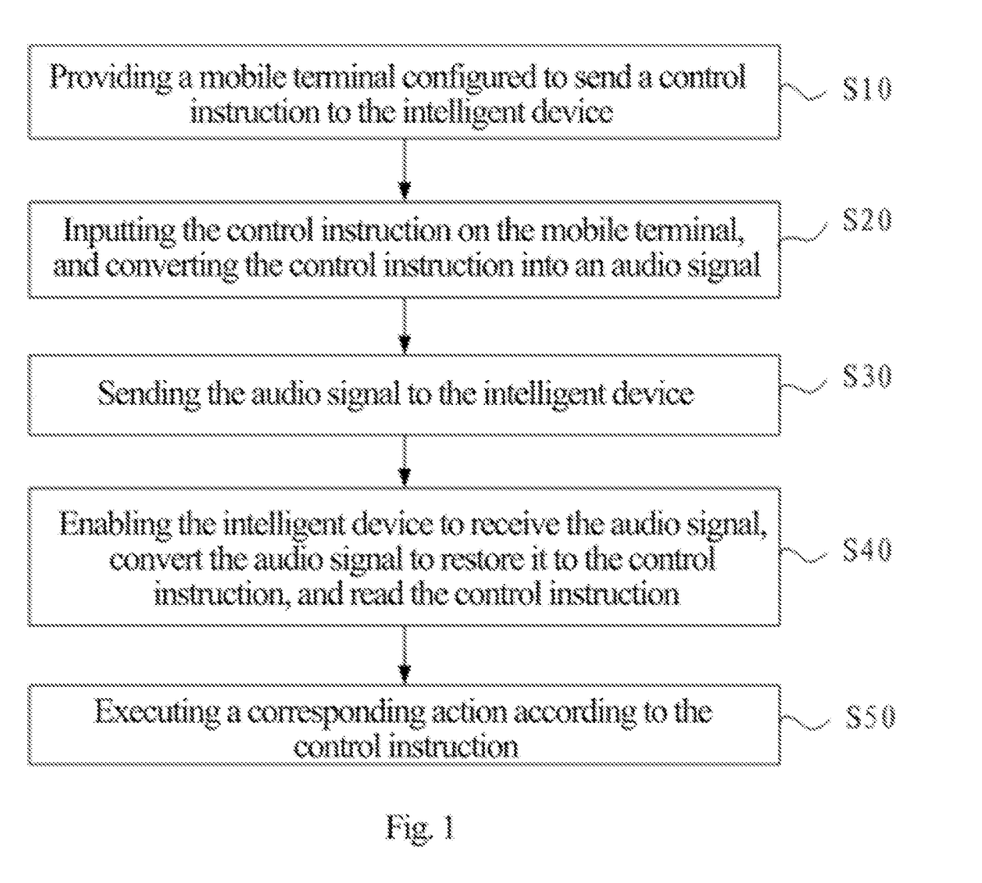
FIG. 1 is a schematic flow diagram of an intelligent device control method in an example of the present disclosure.

Referring to FIG. 1, FIG. 1 is a schematic flow diagram of an intelligent device control method in an example of the present disclosure. The intelligent device control method provided by the present example comprises Steps S10, S20, S30, S40 and S50. Further description is made below.

Step S10: providing a mobile terminal configured to send a control instruction to the intelligent device.

In the present example, the mobile terminal is separated from the intelligent device and is used for communicating with the intelligent device. For example, the mobile terminal can send an audio signal or a digital signal to the intelligent device, so as to send a control instruction to the intelligent device. In an embodiment, the intelligent device can also feed back to the mobile terminal the information such as its own state. The mobile terminal can be a mobile phone, a portable computer, an iPad, a tablet personal computer, an intelligent wear device and other movable control terminals.

The mobile terminal provided comprises a human-machine interaction module, an audio conversion module, an audio encoding module and an audio sending module (e.g., a loudspeaker).

Step S20: inputting the control instruction on the mobile terminal, and converting the control instruction into an audio signal.

In the present example, the control instruction is input from the human-machine interaction module of the mobile terminal, i.e., a user can input a control instruction through the human-machine interaction module (or an APP) if the user wants the intelligent device to perform desired operations. Inputting text information of a control instruction on the mobile terminal can be achieved by one of the following manners: 1) manually inputting the control instruction from the mobile terminal, 2) setting a plurality of instruction options on the mobile terminal, and selecting one of the instruction options according to needs, and 3) establishing on the mobile terminal an instruction option library which is used for storing control instructions, and selecting, when a corresponding control instruction is needed, a corresponding instruction option from the instruction option library.

The audio conversion module converts the text information of the control instruction into an audio signal. In an embodiment, the audio signal can be encoded by the audio encoding module, so that the audio signal has a specific voiceprint feature.

In an embodiment, a segment of ciphertext identification header can further be added before the audio signal. The ciphertext identification header has one function of identifying whether the audio signal is the one intended to be sent to the intelligent device that receives the audio signal. In cases where there is a plurality of intelligent devices in communication with the mobile terminal, adding a ciphertext identification header can avoid mistakes.

Step S30, sending the audio signal to the intelligent device.

In the present example, the audio sending module of the mobile terminal sends to the intelligent device the audio signal obtained by conversion of the control instruction. The intelligent device can be a cleaning robot, a service robot, a business robot, a learning robot, an automobile, an intelligent toy, an electric rice cooker, an air conditioner, a television, a washing machine, an adjustable illuminating lamp, etc., among which the cleaning robot can include a sweeping machine, a dust collector, a mopping machine, a glass cleaning machine, etc. In the implementation process, it is feasible to send the audio signal to one intelligent device, or send the audio signal to a plurality of intelligent devices. Whether the audio signal is sent to one intelligent device or a plurality of intelligent devices, the mobile terminal sends the audio signal by a loudspeaker, and it may only need to send the audio signal once in the same mode.

If the mobile terminal is provided with a plurality of instruction sending modes, a voiceprint sending mode is selected, and if the mobile terminal is provided with only the voiceprint sending mode, the voiceprint sending mode is directly used.

The intelligent device can comprise an audio receiving module, a voiceprint decoding module, a prompting module, a storage module, etc.

Step S40: enabling the intelligent device to receive the audio signal, convert the audio signal and restore it to the control instruction, and read the control instruction.

In the present example, the intelligent device receives the audio signal of the control instruction, converts the audio signal into the original control instruction, parses and reads the control instruction so as to clarify what the instruction given by the mobile terminal is.

In an embodiment, after receiving the audio signal, the intelligent device extracts the voiceprint feature of the audio signal and decodes the same to determine the source of the audio signal, i.e., determining whether the audio signal comes from the mobile terminal, wherein if yes, a corresponding response is given, and if not, the audio signal is ignored.

Here, the audio encoding and decoding protocol adopted for decoding is identical to the audio encoding and decoding protocol used for encoding the audio signal.

Step S50: executing a corresponding action according to the control instruction.

In the present example, after the specific control instruction received by the intelligent device is clarified according to the control instruction obtained by restoring of the audio signal, a corresponding response is given. The intelligent device can feed the condition information of receiving and executing the control instruction back to the mobile terminal through the Internet, namely the intelligent device and the mobile terminal both access the internet, after the mobile terminal sends out the audio signal, the mobile terminal is configured to go into a state of monitoring broadcast, and will obtain, by monitoring, the information of the intelligent device, and after parsing the received broadcast content, the mobile terminal responds to the parsed broadcast content.

In an embodiment, the intelligent device can also feed the condition information of receiving and executing the control instruction back to the mobile terminal by sending an audio signal, i.e., the intelligent device can interact with the mobile terminal in the same audio-based communication mode as adopted by the mobile terminal.

After successfully reading the control instruction, the intelligent device gives prompt information, such as a text prompt, a voice prompt or a lamplight prompt.

In the present example, it is possible to input a control instruction on the mobile terminal, convert the control instruction into an audio signal and send the audio signal to the intelligent device, so that the intelligent device receives the audio signal and converts the audio signal to restore it to the control instruction. In this way, the control instruction is successfully transmitted to the intelligent device, without the use of a third-party device. An operator can simply and intuitively performs operations on the mobile terminal to directly transmit to the intelligent device the audio signal sent by the mobile terminal, so that the transmission of the control instruction is simple, convenient and efficient, which improves the user experience and saves the cost.

In addition, since the control instruction can be converted into an audio signal and then sent out, it is feasible to send the audio signal to a plurality of intelligent devices at the same time by using the same mobile terminal, which saves time and resources, thereby achieving highly-efficient transmission of the control instruction.

Figure 2:
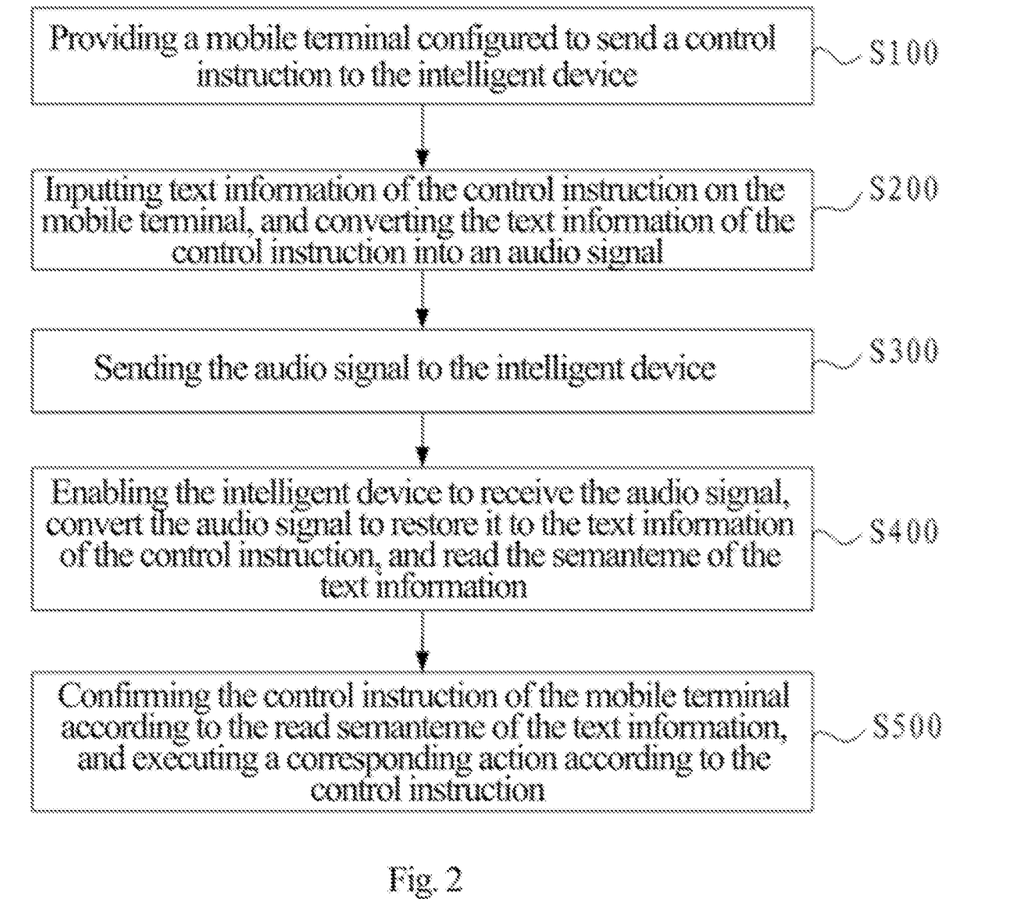
FIG. 2 is a schematic flow diagram of an intelligent device control method in an example of the present disclosure.

Referring to FIG. 2, FIG. 2 is a schematic flow diagram of an intelligent device control method in an example of the present disclosure. The intelligent device control method provided by the present example comprises Steps S100, S200, S300, S400 and S500. Further description is made below.

Step S100: providing a mobile terminal configured to send a control instruction to the intelligent device.

In the present example, the mobile terminal is separated from the intelligent device and is used for communicating with the intelligent device, for example, the mobile terminal can send an audio signal or a digital signal to the intelligent device, and send a control instruction to the intelligent device. In an embodiment, the intelligent device can also feed back to the mobile terminal the information such as its own state. The mobile terminal can be a mobile phone, a portable computer, an iPad, a tablet personal computer, an intelligent wear device and other movable control terminals.

The mobile terminal provided comprises a human-machine interaction module, an audio conversion module, an audio encoding module and an audio sending module (e.g., a loudspeaker).

Step S200: inputting text information of the control instruction on the mobile terminal, and converting the text information of the control instruction into an audio signal.

In the present example, text information of the control instruction is input from the human-machine interaction module of the mobile terminal, i.e., if a user wants the intelligent device to perform some operation, the user can input, through the human-machine interaction module, text information capable of expressing the corresponding instruction. Inputting text information of a control instruction on the mobile terminal can be achieved by one of the following manners: 1) manually inputting the text information of the control instruction from the mobile terminal, 2) setting a plurality of instruction options on the mobile terminal, and selecting one of the instruction options according to needs, and 3) establishing on the mobile terminal an instruction option library which is used for storing control instructions, and selecting, when a corresponding control instruction is needed, a corresponding instruction option from the instruction option library.

The audio conversion module converts the text information of the control instruction into an audio signal. In an embodiment, the audio signal can be encoded by the audio encoding module, so that the audio signal has a specific voiceprint feature.

In an embodiment, a segment of ciphertext identification header can further be added before the audio signal. The ciphertext identification header has one function of identifying whether the audio signal is the one intended to be sent to the intelligent device that receives the audio signal. In cases where there is a plurality of intelligent devices in communication with the mobile terminal, adding a ciphertext identification header can avoid mistakes.

Step S300: sending the audio signal to the intelligent device.

In the present example, the audio sending module of the mobile terminal sends to the intelligent device the audio signal of the control instruction. The intelligent device can be a cleaning robot, a service robot, a business robot, a learning robot, an automobile, an intelligent toy, an electric rice cooker, an air conditioner, a television, a washing machine, an adjustable illuminating lamp, etc., among which the cleaning robot can include a sweeping machine, a dust collector, a mopping machine, a glass cleaning machine, etc. In the implementation process, it is feasible to send the audio signal to one intelligent device, or send the audio signal to a plurality of intelligent devices. Whether the audio signal is sent to one intelligent device or a plurality of intelligent devices, the mobile terminal sends the audio signal by a loudspeaker, and it may only need to send the audio signal once in the same mode.

If the mobile terminal is provided with a plurality of instruction sending modes, a voiceprint sending mode is selected, and if the mobile terminal is provided with only the voiceprint sending mode, the voiceprint sending mode is directly used.

The intelligent device can comprise an audio receiving module, a voiceprint decoding module, a prompting module, a storage module, etc.

Step S400: enabling the intelligent device to receive the audio signal, convert the audio signal and restore it to the text information of the control instruction, and read the semanteme of the text information.

In the present example, the intelligent device receives the audio signal of the control instruction, converts the audio signal into text information, parses and reads the semanteme of the text information so as to clarify the instruction (control instruction) given by the mobile terminal.

In an embodiment, after receiving the audio signal, the intelligent device extracts the voiceprint feature of the audio signal and decodes the same to determine the source of the audio signal, i.e., determining whether the audio signal comes from the mobile terminal, wherein if yes, a corresponding response is given, and if not, the audio signal is ignored.

Here, the audio encoding and decoding protocol adopted for decoding is identical to the audio encoding and decoding protocol used for encoding the audio signal.

Step S500: confirming the control instruction of the mobile terminal according to the read semanteme of the text information, and executing a corresponding action according to the control instruction.

In the present example, the specific control instruction received by the intelligent device is clarified according to the text information obtained by restoring of the audio signal, and a corresponding response is given. The intelligent device can feed the condition information of receiving and executing the control instruction back to the mobile terminal through the internet, namely the intelligent device and the mobile terminal both access the internet, after the mobile terminal sends out the audio signal, the mobile terminal is configured to go into a state of monitoring broadcast, and will obtain, by monitoring, the information of the intelligent device, and after parsing the received broadcast content, the mobile terminal responds to the parsed broadcast content.

In an embodiment, the intelligent device can also feed the condition information of receiving and executing the control instruction back to the mobile terminal by sending an audio signal, i.e., the intelligent device can interact with the mobile terminal in the same audio-based communication mode as adopted by the mobile terminal.

After successfully reading the control instruction, the intelligent device gives prompt information, such as a text prompt, a voice prompt or a lamplight prompt.

In the present example, it is possible to input text information of the control instruction on the mobile terminal, convert the text information of the control instruction into an audio signal and send the audio signal to the intelligent device, so that the intelligent device receives the audio signal, converts the audio signal to restore it to the text information of the control instruction, and reads the semanteme of the text information. In this way, the control instruction is successfully transmitted to the intelligent device, without the use of a third-party device. An operator can simply and intuitively perform operations on the mobile terminal to directly transmit to the intelligent device the audio signal sent by the mobile terminal, so that the transmission of the control instruction is simple, convenient and highly efficient, which improves the user experience and saves the cost.

As described above, the intelligent device of the present disclosure can be a cleaning robot, a service robot, a business robot, a learning robot, an automobile, an intelligent toy, an electric rice cooker, an air conditioner, a television, a washing machine, an adjustable illuminating lamp, etc., among which the cleaning robot can include a sweeping machine, a dust collector, a mopping machine, a glass cleaning machine, etc. For clearness of the principle of the technical solutions of the present disclosure, and for the conciseness and ease of description, further description is made below by taking a cleaning robot as an example, which, however, cannot be construed as a limit to the present disclosure.

Figure 3:
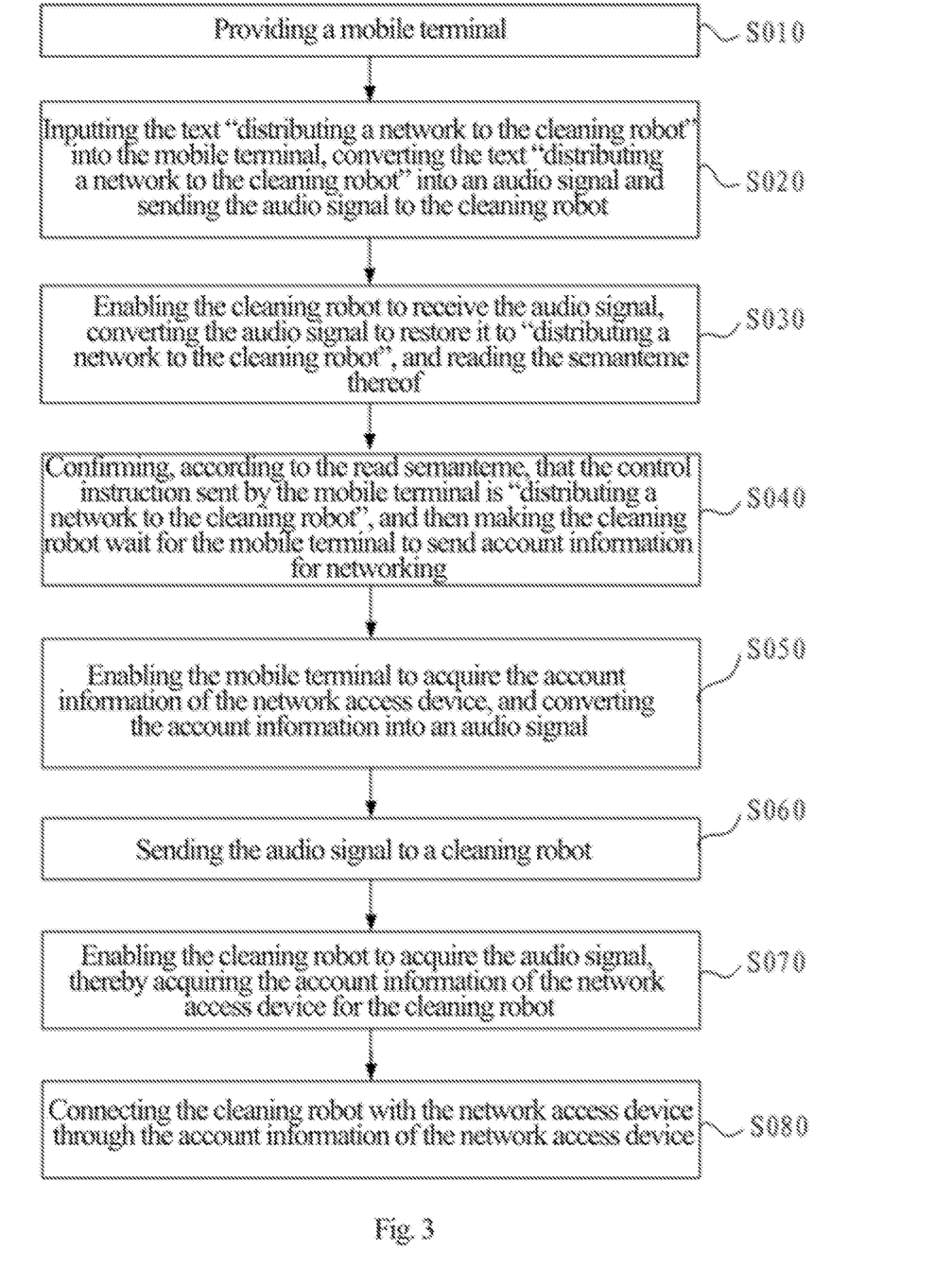
FIG. 3 is a schematic flow diagram of an intelligent device control method in an example of the present disclosure.

Referring to FIG. 3, FIG. 3 is a schematic flow diagram of an intelligent device control method in an example of the present disclosure. In the present example, the intelligent device control method is further described by taking an example that a mobile terminal controls a cleaning robot (i.e., intelligent device) to be connected to a network, which method comprises Steps S010, S020, S030, S040, S050, S060, S070 and S080. The description is made below.

Step S010: providing a mobile terminal.

In the present example, the mobile terminal is separated from the cleaning robot and is used for communicating with the cleaning robot, for example, the mobile terminal can send an audio signal or a digital signal to the cleaning robot, and send a control instruction to the cleaning robot. In an embodiment, the cleaning robot can also feed back to the mobile terminal the information such as its own state. The mobile terminal can be a mobile phone, a portable computer, an iPad, a tablet personal computer, an intelligent wear device and other movable control terminals.

The mobile terminal provided can comprise an audio sending module, such as a loudspeaker.

The cleaning robot provided by the present example is used for cleaning a surface to be cleaned (i.e., executing a task), e.g., cleaning the floor, cleaning the glass, etc. The cleaning robot can be, for example, a sweeping machine, a dust collector, a glass cleaning machine, a mopping machine, etc. The cleaning robot can comprise a communication module, such as a WiFi module. The cleaning robot can further comprise a voiceprint acquisition module and a voiceprint decoding module. The voiceprint acquisition module can receive an audio signal, and the audio signal is decoded by the voiceprint decoding module and then converted into text information and is restored to an original code stream. For example, the voiceprint acquisition module may be a microphone, and the voiceprint decoding module may be a voiceprint decoding chip installed with decoding software. The cleaning robot can comprise a cleaning module, a walking assembly, a dirt accommodating assembly, etc. (not shown in the figures), the examples of the cleaning module include a cleaning assembly, a brush assembly, a mop assembly, etc., the examples of the walking assembly include a wheel assembly, a caterpillar track, etc., and the examples of the dirt accommodating assembly include a garbage box, a sewage tank, etc. These are all disclosed in the prior art and are not described in detail herein.

Step S020, inputting the text "distributing a network to the cleaning robot" into the mobile terminal, converting the text "distributing a network to the cleaning robot" into an audio signal and sending the audio signal to the cleaning robot.

Step S030, enabling the cleaning robot to receive the audio signal, convert the audio signal to restore it to "distributing a network to the cleaning robot", and read the semanteme thereof.

Specifically, the audio signal is decoded and restored to the text "distributing a network to the cleaning robot", so that the cleaning robot reads the semanteme of the text to clarify what the control instruction sent by the mobile terminal is.

Step S040: making the cleaning robot wait for the mobile terminal to send account information for network distribution, after determining according to the read semanteme that the control instruction sent by the mobile terminal is "distributing a network to the cleaning robot".

Specifically, the cleaning robot determines, based on the read semanteme, that the control instruction sent by the mobile terminal is "distributing a network to the cleaning robot", i.e., clarifying what the control instruction sent by the mobile terminal is. The cleaning robot then waits for the account information sent by the mobile terminal, with the account information used for networking. If the cleaning robot cannot clarify what the control instruction sent by the mobile terminal is, corresponding prompting information is sent out to give a prompt that the receiving of the information fails.

Step S050: enabling the mobile terminal to acquire the account information of a network access device, and convert the account information into an audio signal.

Specifically, in the intelligent device control method, a network access device is further provided, for example, the network access device can be a switch, a router and/or other similar devices in connection with the Internet, and the mobile terminal can comprise a communication module. For example, the mobile terminal can comprise a WiFi module, and the WiFi module acquires the account information of the router, the account information can contain merely an account (for example, some open family networks may not require a password) or can contain an account and a password. For example, a user turns on a mobile phone and gets connected to a router through a WiFi module of the mobile phone, and manually inputs the account and the password of the router. Of course, if it is not the first time for the mobile terminal to access the network and the account and the password of the router have been stored, the mobile terminal can automatically acquire the account and the password of the router, which is equivalent to inputting the text information of the control instruction (of course, the account and the password can be manually input during the first connection, and then the account and the password can be saved).

Specifically, the mobile terminal can acquire the account information of the network access device by one of the following manners: (1) manually inputting, by a user, an account and/or a password of the network access device from the mobile terminal, (2) opening the network setting of the mobile terminal, and obtaining a list of network access devices by scanning, selecting a network access device to which the mobile terminal is intended to be connected, and inputting a corresponding password, (3) opening the network setting of the mobile terminal, obtaining a list of network access devices by scanning, selecting an account of a network access device to which the mobile terminal is intended to be connected, and automatically acquiring a corresponding password, and (4) opening the network setting of the mobile terminal, and automatically acquiring an account and/or a password of the network access device.

The mobile terminal provided has a voiceprint network distribution mode and can also have other network distribution modes. When the mobile terminal has a plurality of network distribution modes, the voiceprint network distribution mode is selected, and if the mobile terminal has only the voiceprint network distribution mode, the voiceprint network distribution mode is directly used.

The mobile terminal converts the acquired account information into an audio signal, selects the voiceprint network distribution mode and then sends the audio signal to the cleaning robot. For example, the mobile terminal may comprise an audio conversion module, an audio encoding module and an audio sending module. The audio conversion module converts the account and the password acquired by the mobile terminal into an audio signal, the audio encoding module encodes the audio signal according to a specific audio encoding and decoding protocol, so that the audio signal has a specific voiceprint feature, and then the audio signal is sent to the cleaning robot by the audio sending module (e.g., a loudspeaker). The audio encoding module and the audio sending module can be software or hardware, or a combination of hardware and software.

In the implementation process, it is feasible to add a segment of ciphertext identification header before the audio signal according to actual needs, so that the intelligent device that has received the audio signal can confirm that the audio signal is the one intended to be sent to the intelligent device itself.

Step S060: sending the audio signal to the cleaning robot.

That is, the mobile terminal sends to the cleaning robot the audio signal of the account information (i.e., the account information of the network access device) for network distribution.

Step S070: enabling the cleaning robot to receive the audio signal, thereby acquiring the account information of the network access device for the cleaning robot.

In the present example, the cleaning robot acquires an audio signal sent by the mobile terminal, extracts the voiceprint feature and decodes the same to restore the audio signal into text information of the account information, and acquires for the cleaning robot the account information for the connection to the network access device, so as to achieve networking. For example, the cleaning robot receives an audio signal sent by the mobile terminal through an audio receiving module (which may comprise a microphone), and extracts the voiceprint feature, the voiceprint decoding module decodes the audio signal according to the audio encoding and decoding protocol and restores the audio signal to the text information of the account and the password of the router, so as to acquire, for the cleaning robot, the account information for the connection to the network access device. The audio encoding and decoding protocol adopted for decoding is identical to the audio encoding and decoding protocol used for encoding the audio signal.

Step S080: connecting the cleaning robot with the network access device by means of the account information of the network access device, so as to achieve networking.

In the present example, the cleaning robot is connected with the network access device through the account information obtained by restoring of the audio signal, i.e., accessing internet. For example, the cleaning robot is connected to the router by using the account and the password of the router which are obtained by restoring of the audio signal, so that the cleaning robot accesses the internet. At this time, since both the mobile phone and the cleaning robot are connected with the network access device, the mobile terminal (such as the mobile phone) and the cleaning robot can interact with each other through the internet, the mobile terminal can send a control instruction to the cleaning robot through the internet to control the cleaning robot, and the cleaning robot can feed back its own state to the mobile terminal.

After the internet accessing succeeds, a prompt signal, such as a voice prompt or a lamplight prompt, indicating successful network distribution is sent out.

In the present example (the first example of the intelligent device control method), the account information of the network access device obtained by the mobile terminal is converted into an audio signal, the audio signal is sent to the cleaning robot, and the cleaning robot receives the audio signal. In this way, the account information of the network access device is acquired for the cleaning robot, and the cleaning robot is connected with the network access device through the account information, thereby achieving voiceprint network distribution.

Voiceprint network distribution is adopted between the robot device and the mobile terminal, which is direct and intuitive, can be easily perceived by the user, improves the success rate of network distribution, takes full advantage of the properties that the mobile terminal has a loudspeaker and has the functions of performing voiceprint encoding and sending out an audio signal, and does not require additional hardware cost. Therefore, network distribution between the mobile terminal and the cleaning robot is simple and reliable and also cost-saving.

In an example, after the mobile terminal sends out the audio signal, the mobile terminal is enabled to go into the state of monitoring broadcast, and the mobile terminal is made to parse the received broadcast content and respond to the parsed broadcast content.

Specifically, the mobile terminal turns to UDP (user datagram protocol) broadcasting after sending out the audio signal, to monitor the related information of the cleaning robot at any time. After the cleaning robot is successfully subjected to network distribution, an IP (internet protocol) address will be assigned to the cleaning robot, and the cleaning robot can broadcast its own IP address and port and its own device ID (identification) through UDP. After receiving the IP address and the port of the cleaning robot and its own device ID, the mobile terminal parses the received IP address, port and device ID through UDP or TCP (transfer control protocol), and establishes connection with the cleaning robot according to the parsed IP address, port and device ID, so as to realize direct connection between the cleaning robot and the mobile terminal. That is, the cleaning robot can directly interact with the mobile terminal.

The present example achieves direct connection between the cleaning robot and the mobile terminal on the basis of the first example. Besides communication through the internet, the cleaning robot and the mobile terminal can directly interact with each other, thereby realizing timely and rapid information interaction, improving the information transmission efficiency, and improving the user experience.

Further, in order to further improve the success rate of network distribution, network distribution can be performed repeatedly for multiple times, e.g., three times, and if the UDP broadcast of the cleaning robot still cannot be received after network distribution is performed for three times, a timeout prompt is given and manual handling is adopted.

Figure 4:
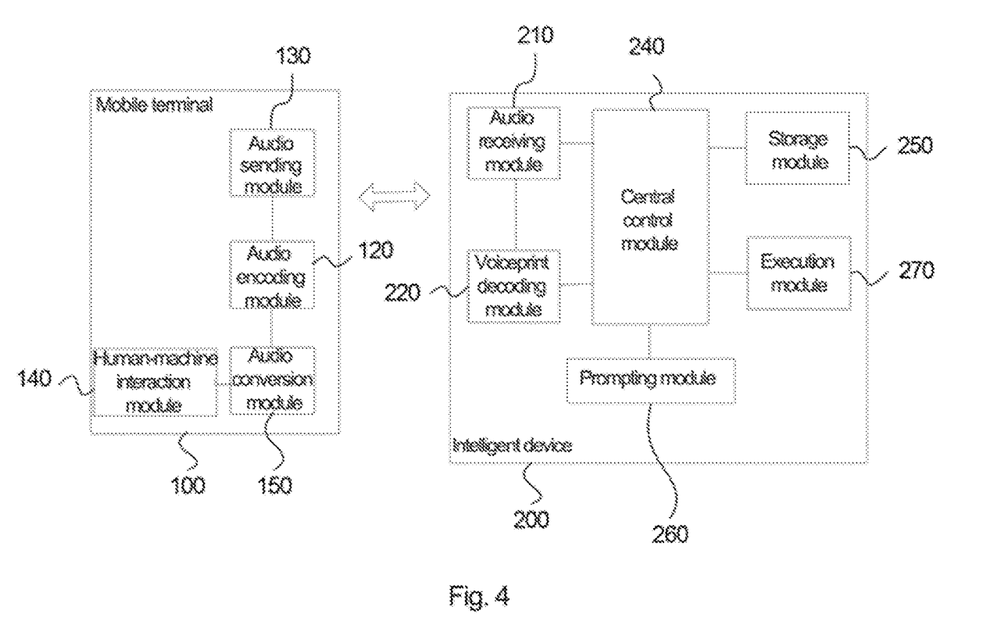
FIG. 4 is a schematic diagram illustrating the constitution of an intelligent device system in an example of the present disclosure.

Examples of the present disclosure further provide an intelligent device system for using the above described intelligent device control method. Referring to FIG. 4, FIG. 4 is a schematic diagram illustrating the constitution of an intelligent device system in an example of the present disclosure. The intelligent device system provided by the present embodiment comprises an intelligent device 200 and a mobile terminal 100 separated from the intelligent device.

The mobile terminal 100 is configured to transmit a user instruction to the intelligent device and receive information. The mobile terminal comprises a human-machine interaction module 140, an audio conversion module 150, an audio encoding module 120 and an audio sending module 130 (e.g., a loudspeaker). For example, the mobile terminal 100 can be installed with an APP and/or hardware capable of emitting voiceprints and an APP and/or hardware capable of receiving voiceprints, as well as an APP for controlling the intelligent device 200. The mobile terminal can be a mobile phone, a portable computer, an iPad, a tablet personal computer, an intelligent wear device and other movable control terminals.

The user inputs text information of a control instruction through the human-machine interaction module 140 of the mobile terminal 100. Understandably, the mobile terminal 100 can automatically acquire the text information of the control instruction, and the text information is not necessarily input by a user manually. The audio conversion module 150 converts the control instruction into an audio signal, and the audio encoding module 120 encodes the audio signal, so that the audio signal has a voiceprint feature and the intelligent device 200 can identify the source of the audio signal. The audio sending module 130 sends the encoded audio signal to one or more intelligent devices 200. Understandably, in an example, it is possible that there is no audio encoding module and the audio signal is not encoded, and the audio sending module 130 can also send out the unencoded audio signal.

The mobile terminal 100 further comprises a terminal storage module (not shown in the figures), wherein the terminal storage module stores a historical-control-instruction option library in which the control instructions the mobile terminal has ever sent out are stored. The user can select a control instruction from the historical-control-instruction option library, and this is equivalent to inputting the text information of the control instruction.

The mobile terminal may be provided with a plurality of instruction sending modes, and in such a case, a voiceprint sending mode is selected, and if the mobile terminal has only the voiceprint sending mode, the voiceprint sending mode is directly used.

In an example, a plurality of instruction options are provided on the mobile terminal 100 (e.g., APP), and the user selects one of the instruction options according to needs, which is also equivalent to inputting the text information of the control instruction.

In an embodiment, the audio encoding module 120 can also add a segment of ciphertext identification header before the audio signal. The ciphertext identification header has one function of identifying whether the audio signal is the one intended to be sent to the intelligent device that receives the audio signal. In cases where there is a plurality of intelligent devices 200 in communication with the mobile terminal 100, adding a ciphertext identification head can avoid mistakes.

The intelligent device 200 can be a cleaning robot, a service robot, a business robot, a learning robot, an automobile, an intelligent toy, an electric rice cooker, an air conditioner, a television, a washing machine and/or an adjustable illuminating lamp, etc., among which the cleaning robot can include a sweeping machine, a dust collector, a mopping machine and/or a glass cleaning machine, etc.

The intelligent device 200 can comprise a central control module 240, an audio receiving module 210, a voiceprint decoding module 220, a prompting module 260, a storage module 250 and an execution module 270. The central control module 240 comprises a confirmation unit (not shown in the figures). The central control module 240 controls the various modules to operate normally and orderly and process related information.

The audio receiving module 210 receives an audio signal sent by the audio sending module 130 of the mobile terminal 100, converts the audio signal into text information, parses and reads the semanteme of the text information to clarify the instruction (control instruction) given by the mobile terminal.

In an embodiment, the audio receiving module 210 receives the audio signal and then extracts the voiceprint feature of the audio signal, and the voiceprint decoding module 220 decodes it to determine the source of the audio signal, i.e., confirming whether the audio signal comes from the mobile terminal 100, wherein if yes, a corresponding response is given, and if not, the audio signal is ignored.

Here, the audio encoding and decoding protocol adopted for decoding is identical to the audio encoding and decoding protocol used for encoding the audio signal.

In an example, the audio signal comprises a segment of ciphertext identification header, and the intelligent device 200 judges, through the ciphertext identification header, whether the control instruction is a control instruction intended to be sent to the intelligent device itself.

The confirmation unit of the central control module 240 confirms, according to the sememe of the read text information, what the control instruction of the mobile terminal 100 is, and the execution module 270 executes the corresponding action according to the control instruction. For example, in an example where the intelligent device 200 is a sweeping machine, if the control instruction is "move forward", the execution module 270 may be embodied as a wheel assembly of the sweeping machine and control programs and/or a circuit thereof, and the central control module 240 controls the wheel assembly to rotate, so that the sweeping moves forward.

After the confirmation unit confirms, according to the sememe of the read text information, what the control instruction of the mobile terminal 100 is, the prompting module 260 will send out prompting information (e.g., a voice prompt, a lamplight prompt or text feedback) to indicate that the control instruction is successfully received and the corresponding action will be executed according to the control instruction. If the control instruction is not received successfully, a corresponding prompt may also be given, but in a different manner from the case where the control instruction is successfully received. In an example, after it is confirmed that the control instruction is successfully received, the central control module 240 stores the audio signal and the corresponding control instruction in the storage module 250, to form a reference table of the audio signals and the control instructions, so that a correct control instruction can be obtained directly according to the reference table of the audio signals and the control instructions when the same audio signal is received next time, and if the received audio signal has already existed in the reference table of the audio signals and the control instructions, it will not be stored repeatedly.

As to the specific working processes and the specific implementation conditions of the intelligent device system, reference may be made to the intelligent device control method as described above, and no repeated description is made herein.

In the present example, text information of the control instruction can be input on the mobile terminal, the audio conversion module converts the text information of the control instruction into an audio signal, and the audio sending module sends the audio signal to the intelligent device, so that the audio receiving module of the intelligent device receives the audio signal, converts the audio signal to restore it to the text information of the control instruction, and reads the sememe of the text information. In this way, the mobile terminal successfully transmits the control instruction to the intelligent device, without the use of a third-party device. An operator can simply and intuitively perform operations on the mobile terminal to directly transmit to the intelligent device the audio signal sent by the mobile terminal, so that the intelligent device system achieves simple, convenient and efficient transmission of the control instruction, which improves the user experience and saves the cost.

In another example, a control instruction is directly input or selected on the mobile terminal, without inputting the text information of the control instruction. The audio conversion module converts the control instruction into audio signal, and sends the audio signal to the intelligent device, such that the audio receiving module of the intelligent device receives the audio signal and converts the audio signal to restore it to the control instruction, and the execution module executes a task according to the control instruction.

In the several examples provided in the present application, it should be understood that the system, the device and the method disclosed can also be realized in other manners. For example, the system examples described above are merely exemplary, for example, the division of the units or modules is merely division according to logical functions, and in actual implementation, the units or modules can be divided in other ways, for example, a plurality of units or modules or assemblies may be combined or may be integrated into another system, or some features can be ignored or not executed. In addition, the displayed or discussed mutual coupling or direct coupling or communication connection may be indirect coupling or communication connection through some interfaces, devices, units or modules, which may be in an electrical, mechanical or other form.

The units or modules described as separate components may or may not be physically separated, and the component displayed as a unit or module may or may not be a physical unit or module, that is, it may be located in one place, or may also be distributed to multiple network units or modules. Some or all of the units or modules can be selected to achieve the objects of the solutions of the respective embodiments according to actual needs.

In addition, the functional units or modules in respective examples of the present disclosure can be integrated in one processing unit or module, or each physically exist separately, or two or more units or modules can be integrated in one unit or module. The integrated unit or module can be implemented in the form of hardware, and can also be implemented in the form of a software functional unit or a module.

When implemented in the form of software functional units or modules and sold or used as independent products, the integrated units or modules can be stored in a computer readable storage medium. Based on such understanding, the essence of the technical solution of the present disclosure, in other words the part of the technical solution of the present disclosure that makes contributions to the prior art, or all or part of this technical solution can be embodied in the form of a software product, and the computer software product is stored in a storage medium, comprising some instructions for enabling one computer device (which can be a personal computer, a server, a network device or the like) to execute all or some of the steps of the methods in the examples of the present disclosure. The above-mentioned storage medium includes various mediums capable of storing program codes, such as a USB flash disk, a mobile hard disk, a read-only memory (ROM), a random access memory (RAM), a magnetic disk, or an optical disk.

In the description of the specification, the description with reference to the term "one embodiment", "some embodiments", "examples", "specific examples" or "some examples" is intended to mean that the specific features, structures, materials or characteristics described in connection with the embodiments or examples are included in at least one embodiment or example of the present disclosure. In this specification, the schematic expressions of the terms do not necessarily refer to the same embodiments or examples. Moreover, the described specific features, structures, materials or characteristics may be combined in any suitable manner in any one or more embodiments or examples.

The embodiments described above do not constitute a limit to the protection scope of the technical solution. Any modifications, equivalent substitutions, improvements, etc.

made within the spirit and principle of the above described embodiments shall all be covered by the protection scope of the technical solution.

We claim:

1. An intelligent device control method for an intelligent device, comprising steps of:
   providing a mobile terminal configured to send a control instruction to the intelligent device,
   inputting the control instruction on the mobile terminal and converting the control instruction into an audio signal, wherein the audio signal comprises a segment of a ciphertext identification header, and the intelligent device judges, through the ciphertext identification header, whether the control instruction is a control instruction to be sent to the intelligent device itself,
   sending the audio signal to the intelligent device,
   enabling the intelligent device to receive the audio signal, convert the audio signal to restore the audio signal to the control instruction, and read the control instruction, and
   executing a corresponding action according to the control instruction.

2. The intelligent device control method according to claim 1, wherein the intelligent device control method further comprises:
   encoding the audio signal so as to make the audio signal have a specific voiceprint feature.

3. The intelligent device control method according to claim 2, wherein the step of enabling the intelligent device to receive the audio signal and convert the audio signal to restore the audio signal to a control instruction comprises:
   the intelligent device receiving the audio signal, extracting and decoding the voiceprint feature of the audio signal to determine a source of the audio signal,
   wherein an audio encoding and decoding protocol used for the decoding is identical to an audio encoding and decoding protocol used for encoding the audio signal.

4. The intelligent device control method according to claim 1, wherein a prompt signal is sent out after the control instruction is read successfully.

5. The intelligent device control method according to claim 1, further comprising:
   selecting a voiceprint sending mode if the mobile terminal is provided with a plurality of instruction sending modes, and directly using the voiceprint sending mode if the mobile terminal is provided with only the voiceprint sending mode.

6. The intelligent device control method according to claim 1, wherein the step of inputting the control instruction on the mobile terminal comprises one of following manners:
   manually inputting text information of the control instruction from the mobile terminal;
   presetting a plurality of control instruction options on the mobile terminal and selecting one of the control instruction options as needed; and
   pre-establishing an instruction option library on the mobile terminal, with the instruction option library being used for storing control instructions, and selecting, when a corresponding control instruction is needed, a corresponding control instruction option from the instruction option library.

7. The intelligent device control method according to claim 1, wherein the step of inputting the control instruction on the mobile terminal and converting the control instruction into an audio signal comprises: inputting text information of the control instruction on the mobile terminal, and converting the text information of the control instruction into an audio signal,
   the step of enabling the intelligent device to receive the audio signal, convert the audio signal to restore the audio signal to the control instruction and read the control instruction comprises: enabling the intelligent device to receive the audio signal, convert the audio signal to restore the audio signal to the text information of the control instruction, and read the semanteme of the text information, and
   the step of executing a corresponding action according to the control instruction comprises: confirming the control instruction of the mobile terminal according to the read semanteme of the text information, and executing the corresponding action according to the control instruction.

8. The intelligent device control method according to claim 1, further comprising: the intelligent device feeding condition information of executing the control instruction back to the mobile terminal through an internet, or
   the intelligent device feeding the condition information of executing the control instruction back to the mobile terminal by sending an audio signal.

9. An intelligent device system, comprising:
   an intelligent device configured for executing a task; and
   a mobile terminal configured for sending a control instruction to the intelligent device,
   wherein the mobile terminal comprises a human-machine interaction module configured for inputting the control instruction, an audio conversion module configured for converting the control instruction into an audio signal, wherein the audio signal comprises a segment of a ciphertext identification header, and the intelligent device judges, through the ciphertext identification header, whether the control instruction is a control instruction to be sent to the intelligent device itself, and an audio sending module configured for sending the audio signal to the intelligent device, and
   wherein the intelligent device comprises an audio receiving module configured for receiving the audio signal, converting the audio signal to restore the audio signal to the control instruction and reading the control instruction, and an execution module configured for executing a corresponding action according to the control instruction.

10. The intelligent device system according to claim 9, wherein the mobile terminal further comprises an audio encoding module, the audio encoding module being configured for encoding the audio signal of the control instruction so as to make the audio signal have a specific voiceprint feature, and
    the intelligent device further comprises a voiceprint decoding module and a confirmation unit, wherein the voiceprint decoding module is configured for decoding the audio signal to restore a code stream during encoding, and the confirmation unit is configured for confirming according to the code stream whether the audio signal comes from the mobile terminal.

11. The intelligent device system according to claim 10, wherein an audio encoding and decoding protocol adopted by the audio encoding module is identical to an audio encoding and decoding protocol adopted by the voiceprint decoding module.

12. The intelligent device system according to claim 9, wherein the intelligent device further comprises a prompting module configured for giving a prompt of successful or unsuccessful reading of the control instruction.

13. A robot system control method, comprising steps of:
providing a robot device configured for executing a task,
providing a mobile terminal configured for communicating with the robot device,
enabling the mobile terminal to acquire account information of a network access device, convert the account information into an audio signal, and send out the audio signal,
enabling the robot device to receive the audio signal, thereby acquiring the account information of the network access device for the robot device, and
connecting the robot device with the network access device through the account information of the network access device, to achieve networking,
wherein the step of enabling the mobile terminal to acquire account information of a network access device and convert the account information into an audio signal comprises:
acquiring an account and a password of the network access device through the mobile terminal, and converting the account and the password of the network access device into an audio signal, and
encoding the audio signal so as to make the audio signal have a specific voiceprint feature, wherein after the mobile terminal sends out the audio signal, following steps are executed: enabling the mobile terminal to go into a state of monitoring broadcast, and enabling the mobile terminal to parse a received broadcast content and respond to the parsed broadcast content.

14. The robot system control method according to claim 13, wherein the step of enabling the robot device to receive the audio signal thereby acquiring the account information of the network access device for the robot device comprises:
the robot device receiving the audio signal, extracting the voiceprint feature of the audio signal, and decoding the voiceprint feature to obtain the account information of the network access device, wherein an audio encoding and decoding protocol adopted for the decoding is identical to an audio encoding and decoding protocol used for encoding the audio signal.

15. The robot system control method according to claim 13, wherein the step of enabling the mobile terminal to acquire account information of a network access device comprises one of following steps:
manually inputting an account and/or a password of the network access device from the mobile terminal;
opening network setting of the mobile terminal, obtaining a list of network access devices by scanning, selecting a network access device to which the mobile terminal is intended to be connected, and inputting a corresponding password;
opening the network setting of the mobile terminal, obtaining the list of network access devices by scanning, selecting an account of a network access device to which the mobile terminal is intended to be connected, and automatically acquiring a corresponding password; and
opening the network setting of the mobile terminal, and automatically acquiring an account and/or a password of the network access device.

16. The robot system control method according to claim 13, further comprising: the robot device obtaining an internet protocol (IP) address after being successfully subjected to network distribution and the robot device broadcasting an IP address, a port and a device identification (ID) of the robot device per se,
wherein the step of enabling the mobile terminal to parse a received broadcast content and respond to the parsed broadcast content comprising: the mobile terminal parsing the IP address, port and device ID received from the robot device, and establishing connection with the robot device according to the parsed IP address, port and device ID.

* * * * *